(12) United States Patent
Bennett

(10) Patent No.: US 11,077,902 B1
(45) Date of Patent: Aug. 3, 2021

(54) SEATING ASSEMBLY IN MULTIPLE CONFIGURATIONS IN A TWO-WHEELED VEHICLE

(71) Applicant: Polaris Industries Inc., Medina, MN (US)

(72) Inventor: Adam D. Bennett, Lino Lakes, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/781,061

(22) Filed: Feb. 4, 2020

(51) Int. Cl.
*B62J 1/28* (2006.01)
*B62J 1/18* (2006.01)
*B62J 1/00* (2006.01)

(52) U.S. Cl.
CPC . *B62J 1/28* (2013.01); *B62J 1/00* (2013.01); *B62J 1/18* (2013.01)

(58) Field of Classification Search
CPC ......... B62J 1/18; B62J 1/28; B62J 1/20; B62J 1/22; B62J 1/00; B62J 1/005
See application file for complete search history.

(56) References Cited

U.S. PATENT DOCUMENTS

| | | | | |
|---|---|---|---|---|
| 6,273,207 | B1* | 8/2001 | Brown | B62J 1/12 180/219 |
| 7,311,232 | B2* | 12/2007 | Watanabe | B62J 7/08 224/413 |
| 8,496,082 | B2* | 7/2013 | Aramayo, II | B62J 9/20 180/219 |
| 2007/0018488 | A1 | 1/2007 | Hein et al. | |
| 2009/0001113 | A1* | 1/2009 | Butkiewicz | B62J 7/04 224/413 |
| 2010/0307852 | A1* | 12/2010 | Aramayo, II | B62J 27/00 180/219 |
| 2011/0115266 | A1* | 5/2011 | Revell | B62J 1/28 297/215.12 |
| 2014/0091602 | A1* | 4/2014 | Idaka | B62J 1/28 297/183.1 |
| 2015/0061334 | A1 | 3/2015 | Inoue et al. | |
| 2016/0101819 | A1 | 4/2016 | Iwata | |
| 2017/0106774 | A1* | 4/2017 | Tsuboi | B62J 1/28 |
| 2017/0217523 | A1* | 8/2017 | Uemura | B62J 1/12 |
| 2018/0151860 | A1* | 5/2018 | David | B60L 50/64 |
| 2018/0281640 | A1* | 10/2018 | Tsurumi | B60N 2/5685 |
| 2020/0047841 | A1* | 2/2020 | Luckjohn | B62J 9/14 |

FOREIGN PATENT DOCUMENTS

JP S6171582 A 4/1986

OTHER PUBLICATIONS

International Search Report and Written Opinion dated Apr. 16, 2021 in corresponding PCT Application No. PCT/US2021/015304.

* cited by examiner

*Primary Examiner* — Timothy J Brindley
(74) *Attorney, Agent, or Firm* — Harness, Dickey & Pierce, P.L.C.

(57) ABSTRACT

A seat assembly for a vehicle having frame, a fender assembly and a longitudinal axis has a first seat pan having a first coupler coupling a first seat to the frame. A cover support is adjacent to the first seat pan. A grab strap is coupled to the first seat pan. A first seat cover is coupled to the first seat pan. A first fastener couples the first seat to the fender assembly. A second seat pan is coupled to the fender assembly with the first fastener. The second seat pan comprising a first opening receiving the grab strap. A second fastener couples the second seat pan to the fender.

20 Claims, 11 Drawing Sheets

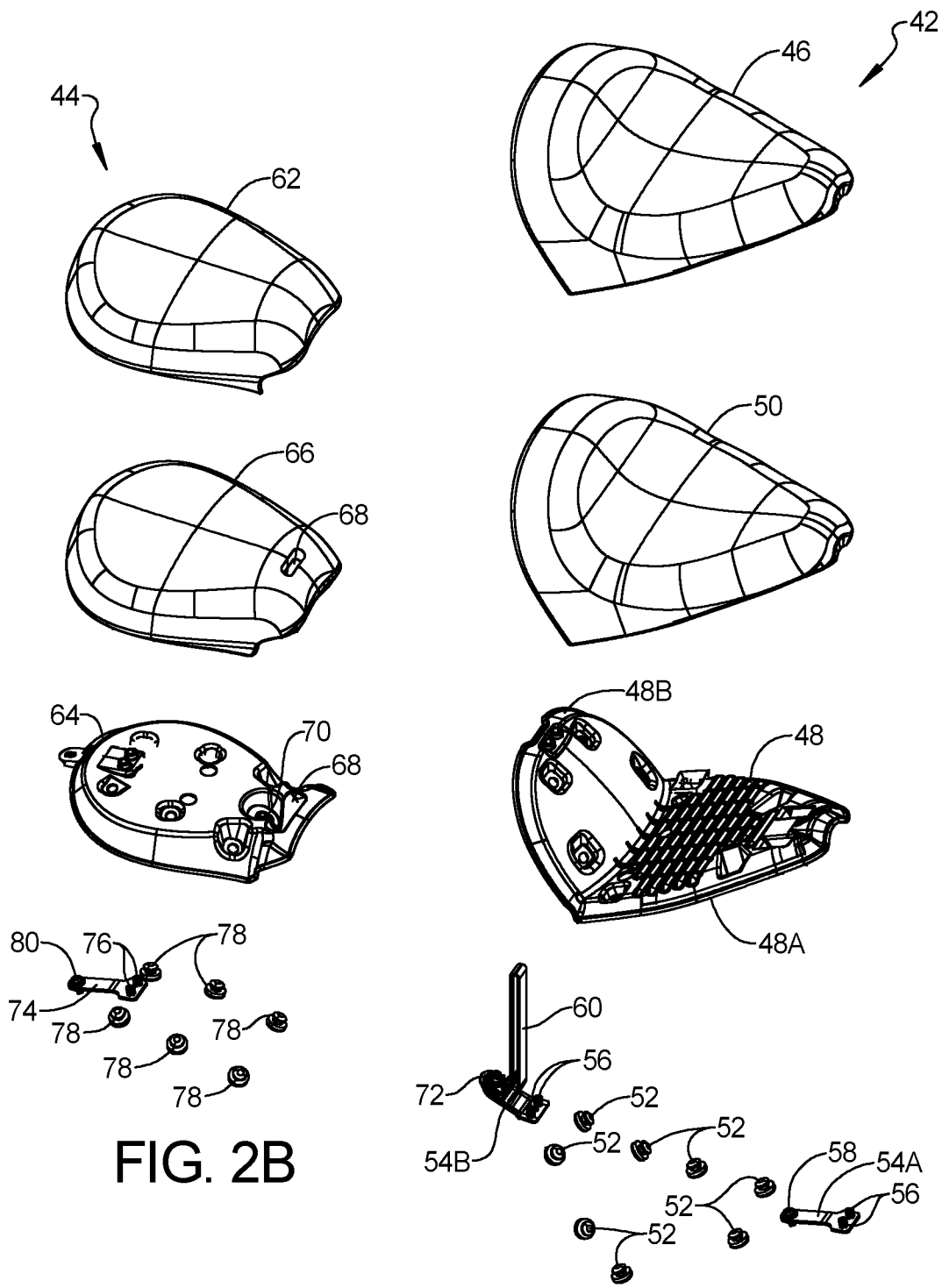

SEATING ASSEMBLY IN MULTIPLE CONFIGURATIONS IN A TWO-WHEELED VEHICLE

FIELD

The present disclosure relates to a seat for a vehicle and, more particularly, to a driver seat coupled to and passenger seat having a grab strap.

BACKGROUND

This section provides background information related to the present disclosure which is not necessarily prior art.

Providing a comfortable seat that is easy to assemble for a vehicle has been a goal for vehicle providers for years. Motorcycle manufacturers often use a common frame for various models with various options. Seating arrangements can vary in the various model. One and two seat configurations are possible. To seat arrangements that allow the customer to make the change are also possible. However, providing a convenient configuration for making the change is important.

SUMMARY

This section provides a general summary of the disclosure, and is not a comprehensive disclosure of its full scope or all of its features.

The present disclosure provides an improved seating configuration that allows easy assembly and reconfiguration from one to two seating positions. While the system is suitable for various types of automotive vehicles, the configuration set forth herein provides a configuration particularly suitable for motorcycles and open air vehicles.

In one aspect of the disclosure, a seat assembly for a vehicle having frame, a fender assembly and a longitudinal axis has a first seat pan having a first coupler coupling a first seat to the frame. A cover support is adjacent to the first seat pan. A grab strap is coupled to the first seat pan. A first seat cover is coupled to the first seat pan. A first fastener couples the first seat to the fender assembly. A second seat pan is coupled to the fender assembly with the first fastener. The second seat pan comprising a first opening receiving the grab strap. A second fastener couples the second seat pan to the fender.

In yet another aspect of the disclosure, a method of assembling a seat assembly includes coupling a front portion of a first seat pan to a vehicle frame, coupling a grab strap to the first seat pan, coupling a rear portion of the first seat pan to a fender assembly, inserting the grab strap through a first opening in a second seat pan, coupling a front portion of the second seat pan to the fender assembly, and coupling a rear portion of the second seat pan to the fender assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is an exploded view of the front seat assembly;

FIG. 2B is an exploded view of the rear seat assembly.

Corresponding reference numerals indicate corresponding parts throughout the various views of the drawings.

DETAILED DESCRIPTION

Example embodiments will now be described more fully with reference to the accompanying drawings. Although the following description includes a motorcycle application, it is understood that the features herein may be applied to any appropriate vehicle, such as snowmobiles, all-terrain vehicles, utility vehicles, moped and scooters. The embodiments disclosed below are not intended to be exhaustive or to limit the invention to the precise forms disclosed in the following detailed description. Rather, the embodiments are chosen and described so that others skilled in the art may utilize their teachings.

The relative terms used in the present disclosure are relative to a vehicle 10 in a normal operating position. The vehicle direction in FIGS. 1A-1C with a longitudinal axis that corresponds to a normal direction of travel. Right, left, front, back, under and above all referred to relative position of the vehicle in a normal upright position on a road surface.

Figure 1A:
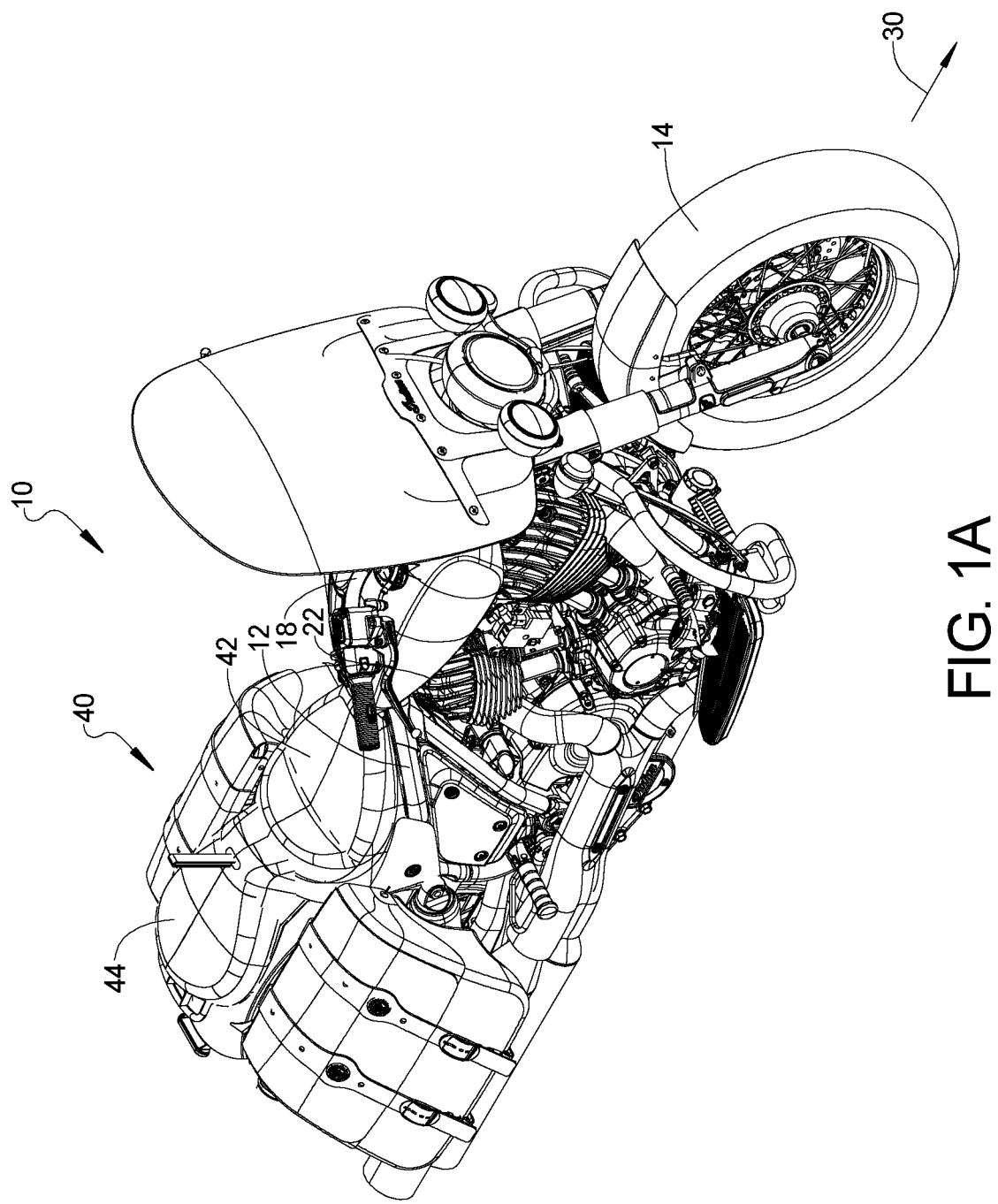
FIG. 1A is a perspective view of a motorcycle having a seat assembly according to the present disclosure.
Figure 1B:
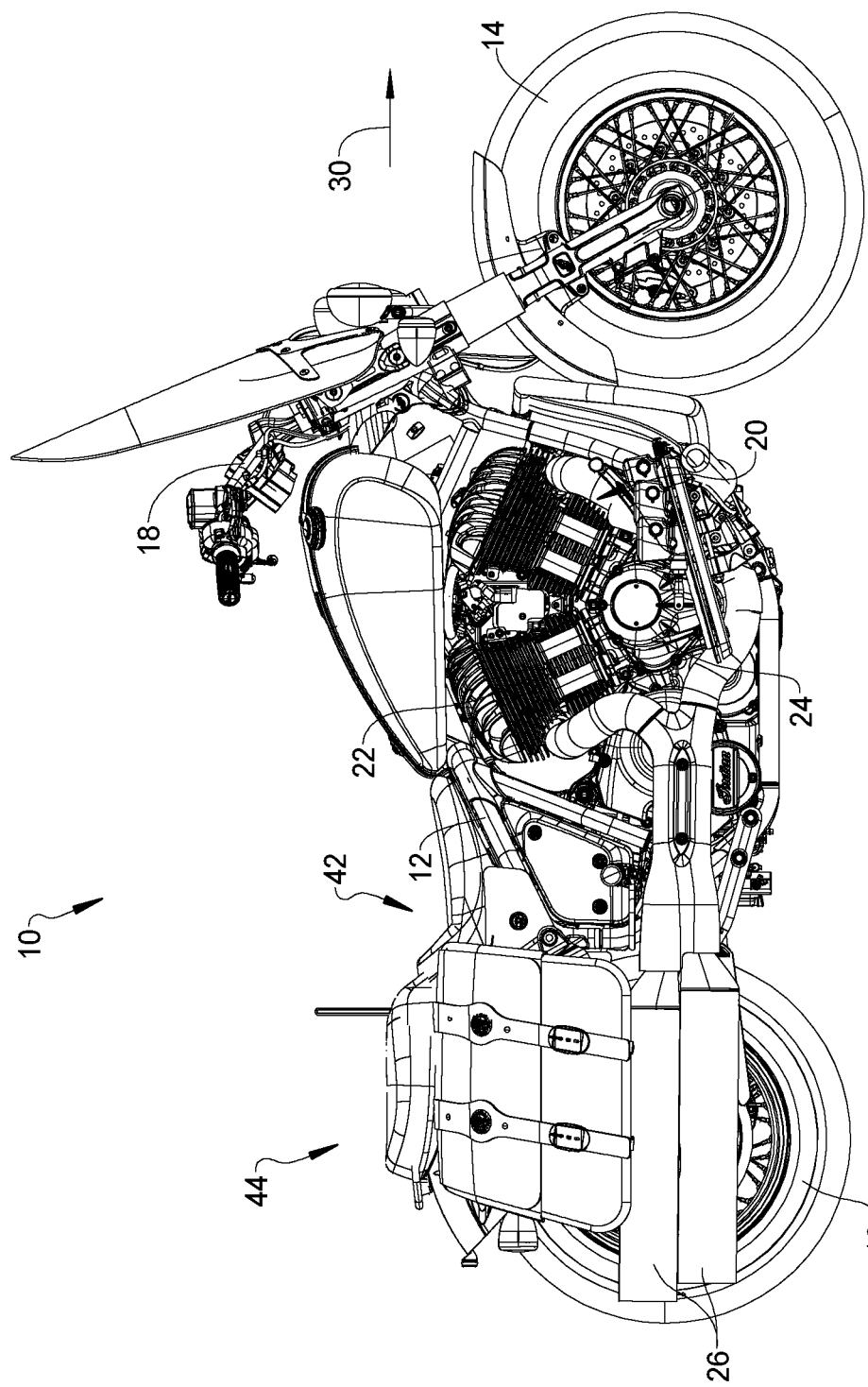
FIG. 1B is a right side view of the motorcycle of FIG. 1A.
Figure 1C:
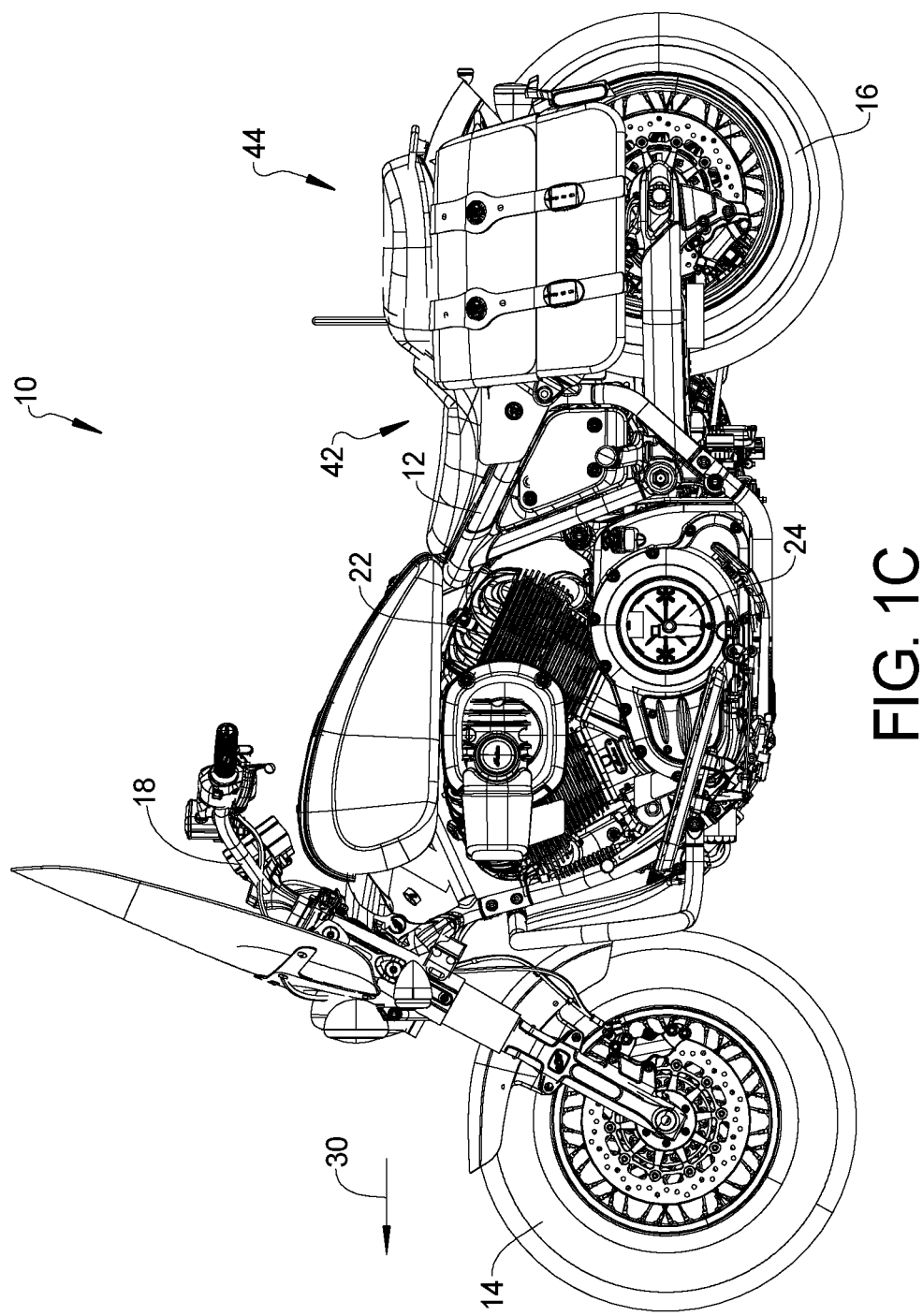
FIG. 1C is a left side view of the motorcycle of FIG. 1A.

Referring now to FIGS. 1A-1C, a vehicle 10 is illustrated. The vehicle 10 in this example is a two-wheeled vehicle. The two-wheeled vehicle 10 illustrated is a touring style motorcycle. However, the present example is also applicable to other types of vehicles including snowmobiles, scooters, utility vehicles, and off-road vehicles that accommodate passengers in a one of many seating positions The vehicle 10 includes a frame 12 that is used to support the vehicle components including wheels 14 and 16, Wheel 14 is a front wheel which is coupled to the handlebars 18 by way of a first fork for steering. The rear wheel 16 is a coupled to a powertrain assembly 20 that is used to provide the rotational force to the rear wheel 16, in this example. Of course, all of the wheels on a vehicle or a selected few of the wheels may be coupled to the powertrain assembly 20, The powertrain assembly 20 includes an engine 22 and transmission 24. The powertrain assembly 20 may also include an exhaust pipe 26 that removes waste exhaust from the engine 22.

A rear fender assembly 28 is disposed above the rear wheel 16. The rear fender assembly 28 is secured to the frame 12.

The vehicle 10 also has a longitudinal axis 30 that extends in the direction of forward travel of the vehicle 10 that extends from the front wheel 14 to the rear wheel 16.

The frame 12 may also be used to support a seat assembly 40. The seat assembly 40 can include a driver seat 42 and a passenger seat 44. In this example, the driver seat 42 and the passenger seat 44 are assembled to form the seat assembly 40. However the driver seat 42 may be used without the passenger seat 44. The passenger seat 44 is higher (relative to the road during driving) than the driver seat 42.

Referring now additionally to FIG. 2A, an exploded view of the driver seat 42 of the seat assembly 40 is set forth. A first seat cover 46 is the outer surface of the driver seat 42. The seat cover 46 may be made of various materials including but not limited to cloth, leather, plastics or vinyl. The first seat cover 46 is secured to the first seat pan 48. The seat pan 48 has a bottom portion 48A and a back portion 48B. The shape of the seat pan 48 ultimately determines the space of the seat position. Depending on the vehicle and the desired styling of the vehicle, the first seat pan 48 may take many shapes. A first seat support 50 is disposed between the first seat cover 46 and the first seat pan 48. By way of example, the first seat support 50 may be a cushion formed of a foam material. The first seat support 50 is used to support the body of the driver. Of course, the first seat support 50 may having heating and cooling disposed therein.

The driver seat 42 may also include a plurality of feet 52. The feet 52 are secured to the bottom of the first seat pan 48 to provide isolation between the frame or fender and the first seat pan 48. The feet 52 may be formed of various types of materials including, but not limited to, foam, felt, rubber, plastic or nylon. A first bracket 54B is secured to the rear portion 48B of the first seat pan 48. One or more fasteners 56 may secure the first bracket to the first seat pan 48. A fastener 58 may couple the first bracket 54A and thus the first seat position to the fender assembly 28 as will be described in more detail below. The first bracket 54A is used to secure only the first seat pan 48 to the fender assembly 28.

The first bracket 54A is used when the passenger seat 44 is to be used alone. When the passenger seat 44 is to be used, an alternate first bracket 54B is used. To switch from one configuration to the other the fasteners 56 are removed. The first bracket 54A is removed and bracket 54B is secured with the fasteners 56 to the same position in the first seat pan 48. A grip strap 60 is coupled to the first bracket 54B at grip strap slots 61 set forth below. Various ways for coupling the grip strap 60 to the first bracket 54B may be used. The grip strap 60 may be made of various materials and allows a passenger to grip thereto.

Referring now to FIG. 2B, the passenger seat 44 has a second seat cover 62, a second seat pan 64 and a second seat support 66 disposed between the second seat cover 62 and the second seat pan 64. The second seat pan 64 has a first opening 68 used to receive the grip strap 60 during assembly. A second opening 70 is used to receive the fastener 58 as will be described in more detail below. The second opening 70 has a reinforcement member 72 disposed therein. The reinforcement member 72 is used to receive the fastener 58 (or a fastener head 102 set forth below) during assembly.

A second bracket 74 is secured to the second seat pan 64 with one or more fasteners 76. The fasteners 76 may, for example, be screws. The second seat pan 64 may also include feet 78 formed in a similar manner to that set forth above. The feet 78 are used to space the seat pan 64 from the fender assembly 28. A fastener 80 is used to couple the second bracket 74 and thus the second seat pan 64 to the fender assembly 28.

Figure 3A:
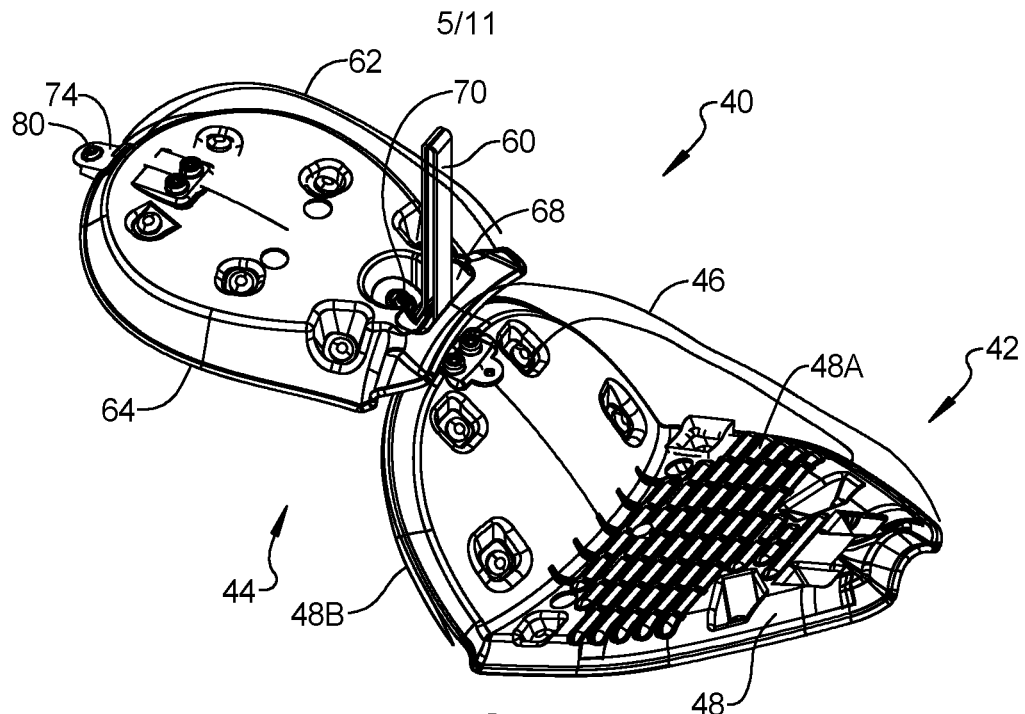
FIG. 3A is a perspective view of seat pans of the seat assembly of FIG. 1A.
Figure 3B:
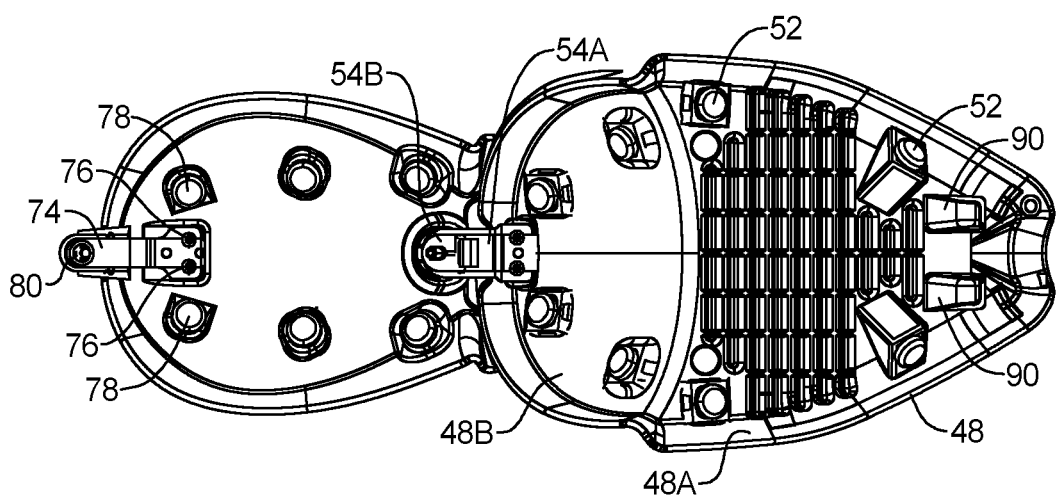
FIG. 3B is an underside view of seat pans of the seat.

Referring now to FIGS. 3A and 3B, the first seat pan 48 is illustrated relative to the second seat pan 64. When the driver seat 42 is coupled to the passenger seat 44, the second seat pan 64 has the rear seat portion 48B partially received therein.

Figure 4:
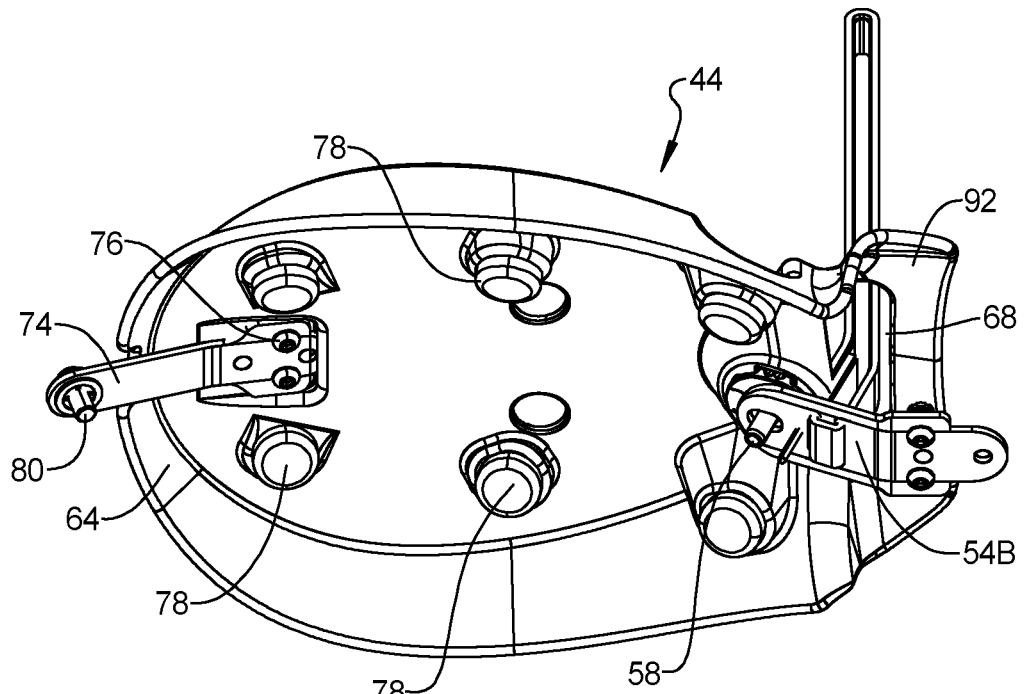
FIG. 4 is an underside view of the first seat pan.

Referring now to FIG. 4, the underside of the second seat pan 64 is illustrated in further detail. A recess 92 in the second seat pan is used to receive at least a portion of the rear of the first seat pan. The first bracket 54B which is coupled to the first seat pan 48 is illustrated. Also, the fastener 58 is also illustrated.

Figure 5:
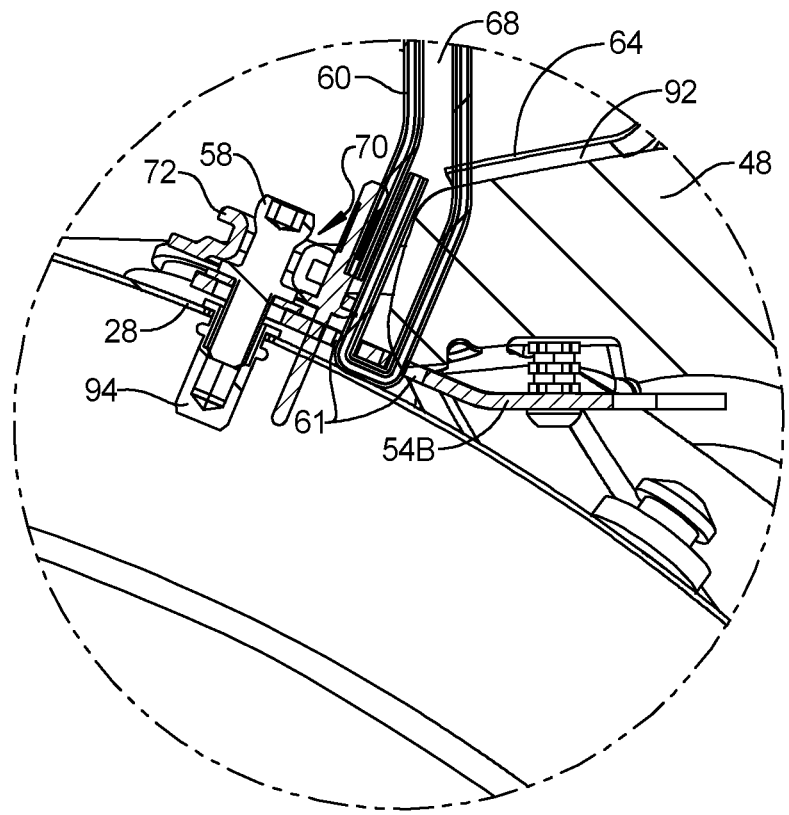
FIG. 5 is a cross-sectional view of the passenger seat coupled to the driver seat.

Referring now to FIG. 5, a cross-sectional view of the first seat pan 48 within the recess of the second seat pan 64 is set forth. In this example, a receiver 94 receives the fastener 58. The fastener 58 is secured within the receiver 94 by a press fit or threading. When the fastener 58 is inserted within the receiver 94, the first bracket 54B is held toward the fender assembly 28. The reinforcement member 72 is illustrated around the thickness of the second seat pan 64 to reinforce the second opening 70.

Figure 6:
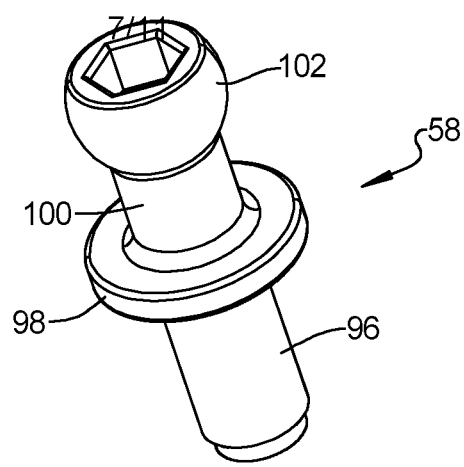
FIG. 6 is a perspective view of the first fastener.

Referring now to FIG. 6, the fastener 58 is illustrated in further detail. The fastener 58 has a bottom portion 96 that may be threaded. A flange portion 98 is adjacent to the bottom portion 96. A shaft portion 100 is directly adjacent to the flange portion 98. The shaft portion 100 has a head portion 102. The head portion 102 has a greater diameter than the shaft portion 100. The head portion 102 may be used to provide an interference fit so that the shaft portion 100 is directly adjacent to the reinforcement member 72 after assembly. The wider head portion 102 retains the second seat pan 64 to the fender assembly 28. The flange 98 provides an increased area over which to provide a force on the first bracket 54B to urge the first bracket 54B towards the fender assembly 28. The second seat pan 64 and/or the reinforcement member 72 may be slightly conformable to receive the head 102 but still retain the fastener 58 in position during operation.

Figure 7:
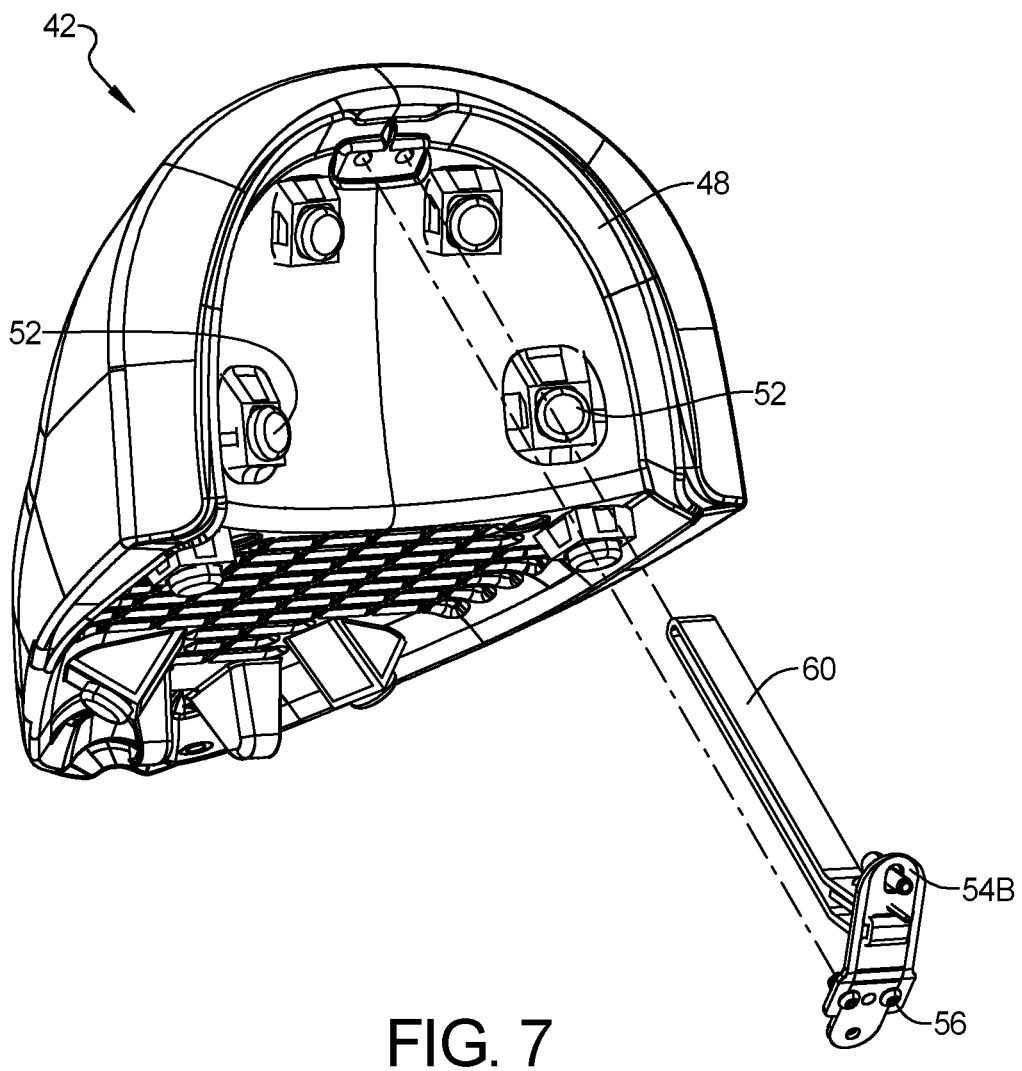
FIG. 7 is a perspective view of the seat back portion of the driver's seat.

Referring now to FIGS. 7-11, a method for assembling the seat assembly 40 is set forth. Specifically, in step 210, the grip strap 60 is coupled to the driver seat 42. In particular, the grip strap 60 may be looped through the first bracket 54B. The first bracket 54B is assembled to the first seat pan 48 using the fasteners 56. This is illustrated in FIG. 7.

Figure 8:
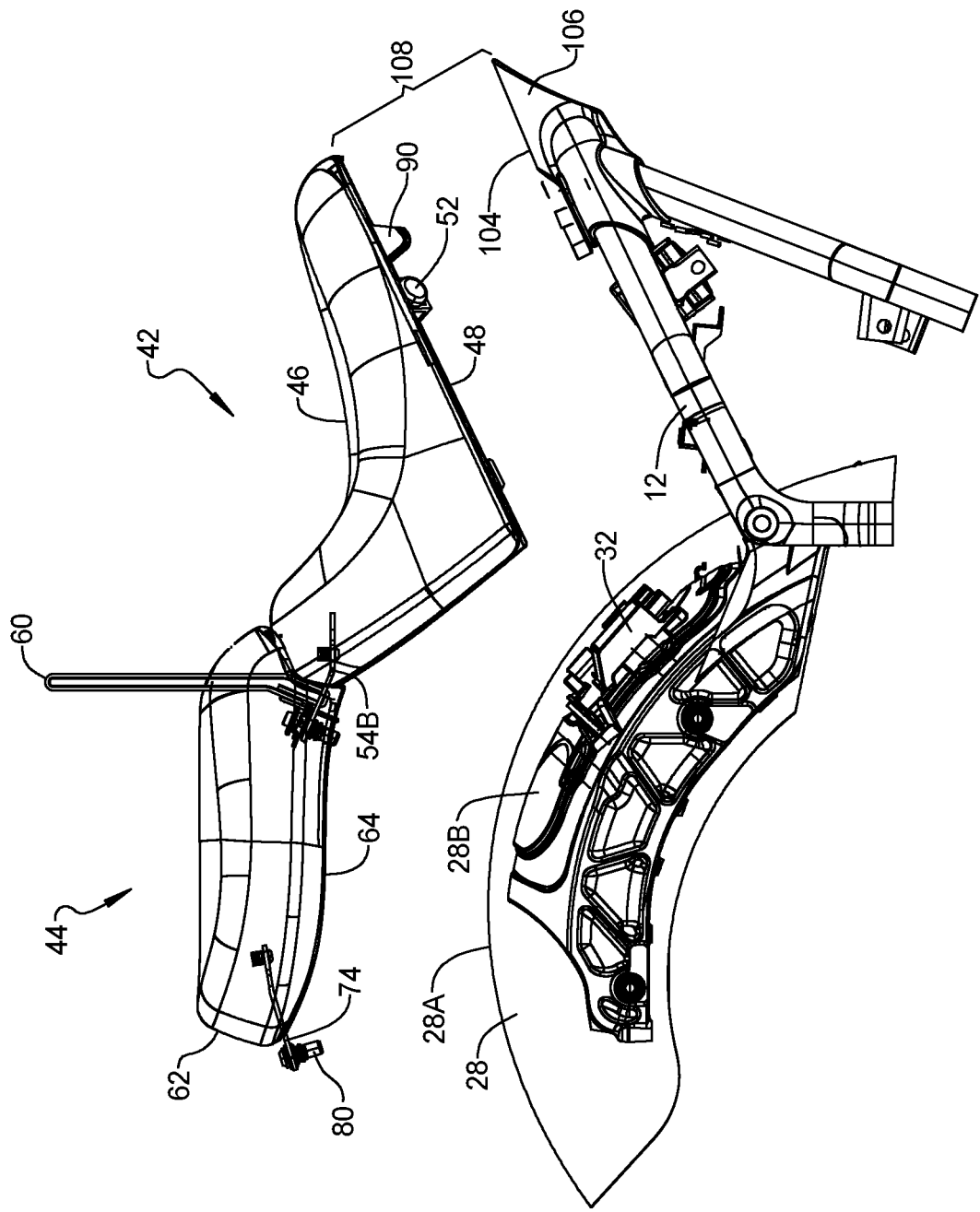
FIG. 8 is a side view of the first seat pan being assembled to the frame.
Figure 11:
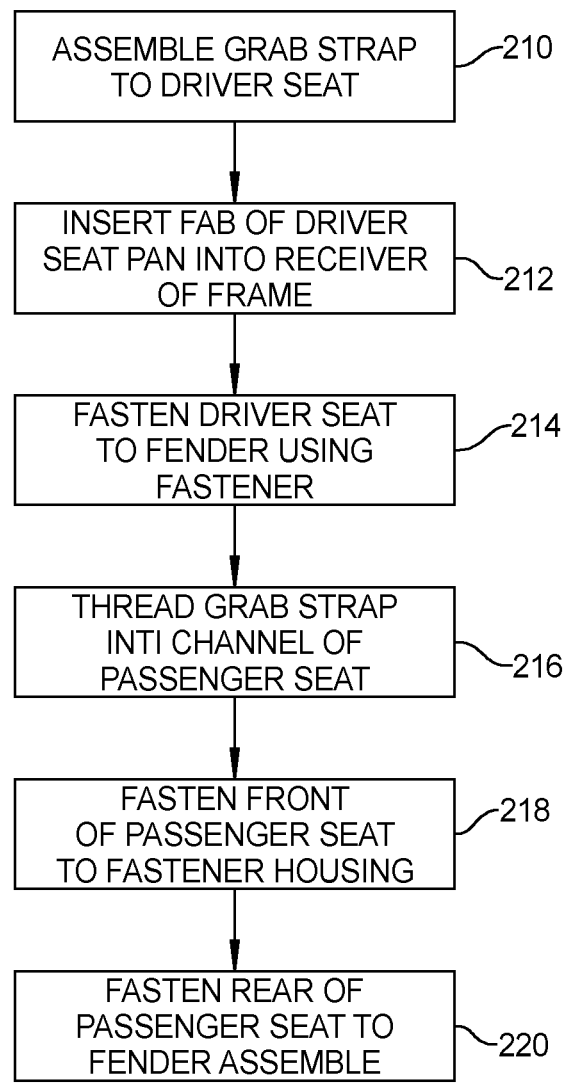
FIG. 11 is a flow chart of a method for assembling the seat.

Referring now specifically to FIG. 8 and FIG. 11, in step 212, the tabs 90 illustrated above are inserted within receivers 104 of the frame 12. The receiver 104 may be disposed directly on the frame or in a bracket 106 coupled to the frame 12. The tabs 90 and the receivers 104 may be referred to as a coupler 108 for coupling the seat pan 48 to the frame. In this example, the receiver 104 comprises a pair of slots disposed on either side of the vehicle 10. The receiver 104 receive the tabs 90 with a forward motion of the first seat pan 48. In this example, the tabs 90 are inserted into the receiver 104 in a forward direction.

FIG. 8 also illustrates further details of the fender assembly 28. The fender assembly 28 may include an out fender 28A an inner fender 28B and a space for electronics 32 therebetween. The electronics 32 are hidden from view by the fender assembly 28.

Figure 9:
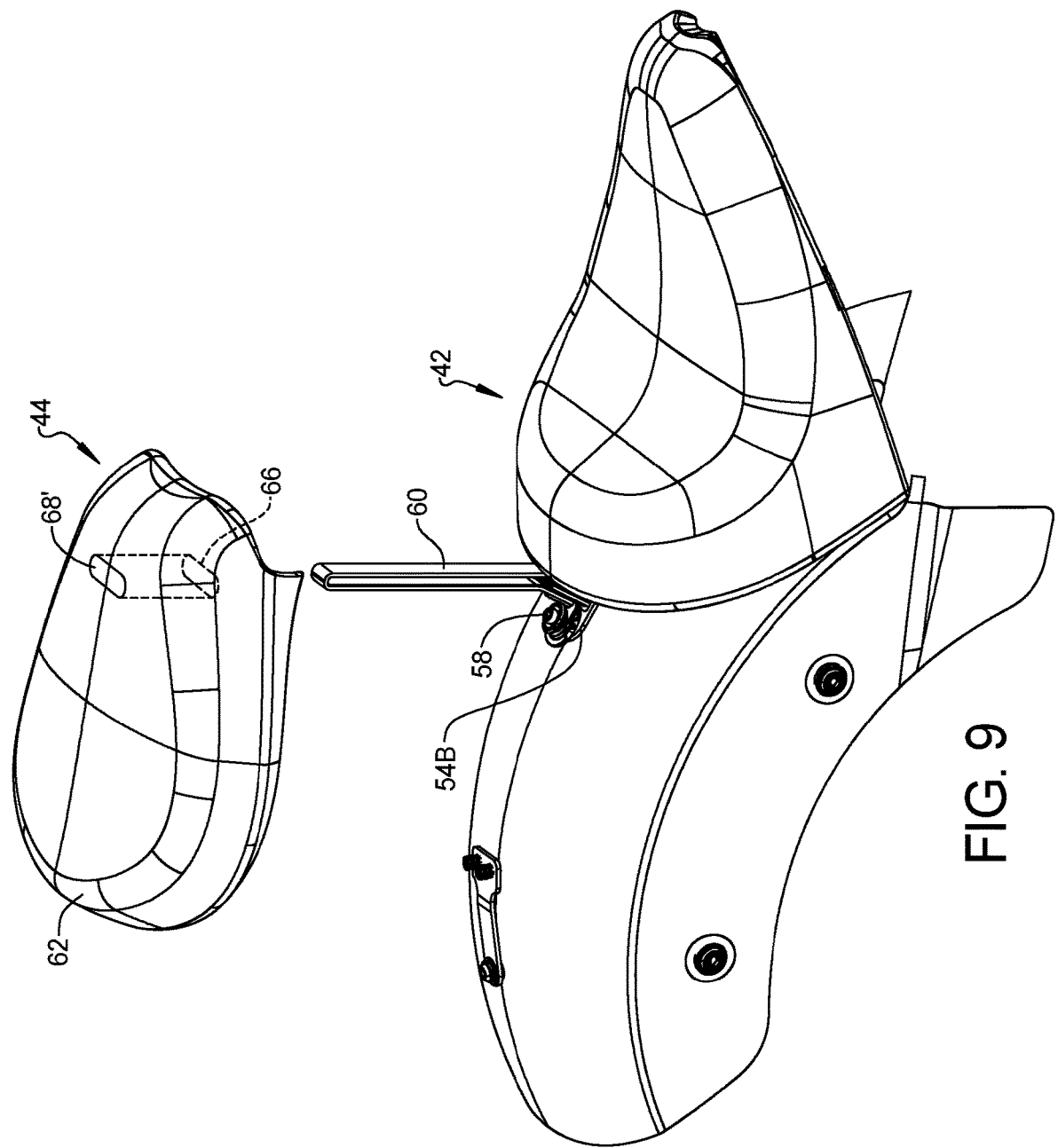
FIG. 9 is a perspective view of the passenger seat being assembly to the vehicle.

Referring now to FIGS. 9 and 11, step 214 fastens the driver seat pan 48 to the fender assembly 28 using the fastener 58. The fastener 58 holds the first bracket 54BB against the fender assembly 28. The opening 68 has the grip strap 60 inserted therein. It should be noted that the opening 68 corresponds to the opening 68' within the seat cover 62 and the second seat support 66. In FIG. 9, the first opening 68 is positioned over the fastener 58. That is, the head portion 102 is received within the second opening 70. The reinforcement member 72 is used to reinforce the second seat pan and receive the head portion 102 so that the shaft portion 100 is adjacent to the reinforcement member 72.

Figure 10:
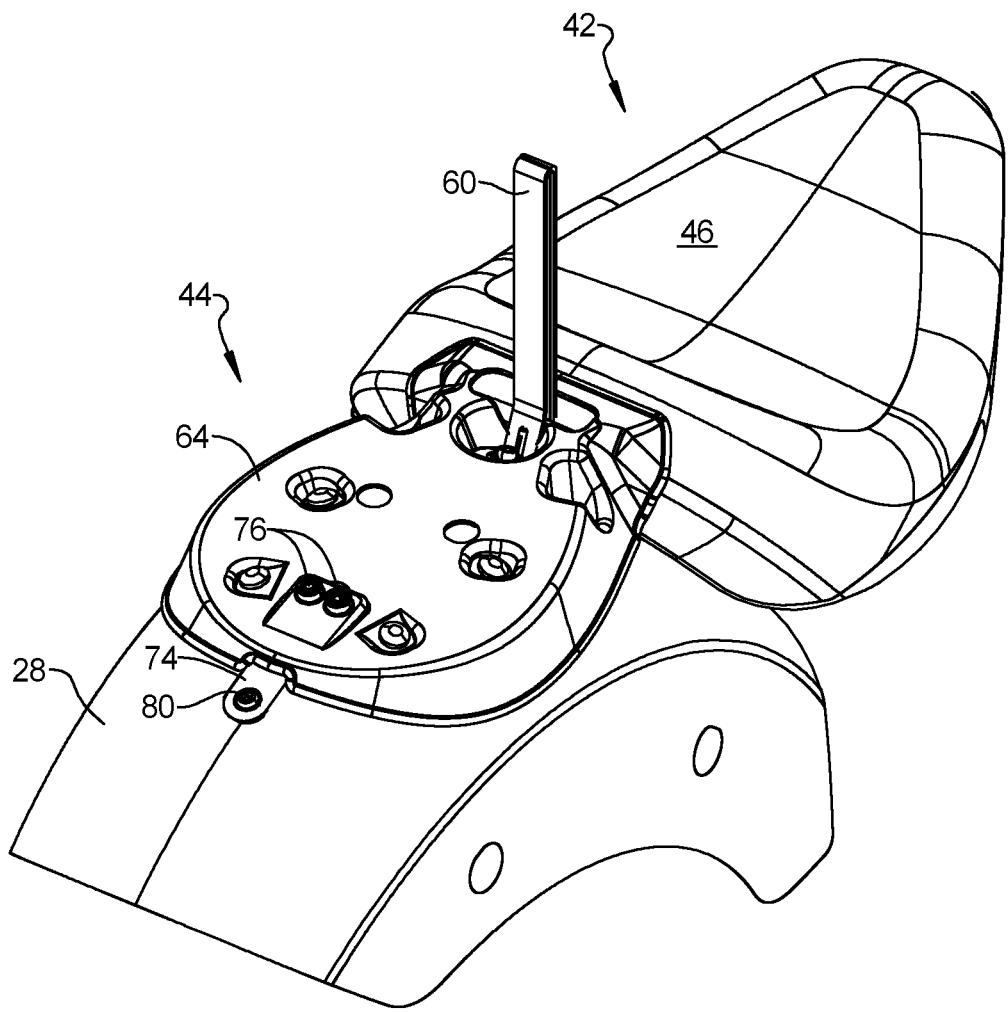
FIG. 10 is a partial perspective view of the passenger seat coupled to the fender.

Referring now to FIGS. 10 and 11, the rear of the passenger seat is coupled to the fender assembly 28. The fastener 76 is used to retain the second bracket 74 and thus the second seat pan 64 against the fender assembly 28.

In operation, the driver seat 42 may be used alone and thus the grip strap 60 may be tucked under the first seat pan or removed. When a second or passenger seat 44 is desired, the second seat pan 64 is coupled to the fender assembly 28 in the front through the fastener 58 and in the back through the fastener 76.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The foregoing description of the examples has been provided for purposes of illustration and description. It is not intended to be exhaustive or to limit the disclosure. Individual elements or features of a particular example generally not limited to that particular example, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat assembly for a vehicle having frame, a fender assembly and a longitudinal axis comprising:
   a first seat pan having a first coupler coupling a first seat to the frame;
   a cover support adjacent to the first seat pan;
   a grab strap coupled to the first seat pan;
   a first seat cover coupled to the first seat pan;
   a first fastener coupling the first seat to the fender assembly;
   a second seat pan coupled to the fender assembly with the first fastener, said second seat pan comprising a first opening receiving the grab strap; and
   a second fastener coupling the second seat pan to the fender.

2. The seat assembly as recited in claim 1 wherein the first coupler comprises a tab coupling the first seat pan to the frame.

3. The seat assembly as recited in claim 1 wherein the first coupler comprises a first tab and a second tab coupling the first seat pan to respective sides of the frame.

4. The seat assembly as recited in claim 1 wherein the first fastener is coupled to a first receiver in the fender assembly.

5. The seat assembly as recited in claim 1 wherein the fender assembly comprises a first fender portion and a second fender portion spaced apart from the first fender portion.

6. The seat assembly as recited in claim 1 wherein the grab strap is coupled to a first bracket, said first bracket coupled to the first seat pan.

7. The seat assembly as recited in claim 6 wherein the first bracket is coupled to an underside of the first seat pan.

8. The seat assembly as recited in claim 6 wherein the first fastener couples the first seat pan to the fender assembly through the first bracket.

9. The seat assembly as recited in claim 6 wherein the second seat pan comprises a second opening and wherein the first fastener comprises a head extending from the first bracket, said head received in the second opening.

10. The seat assembly as recited in claim 1 further comprising a reinforcing member disposed within the second opening, said second seat pan coupled to the first fastener at reinforcing member.

11. The seat assembly as recited in claim 1 further comprising a second bracket coupled to the second seat pan, said second fastener coupling the second bracket to the fender assembly.

12. The seat assembly as recited in claim 1 wherein the first seat pan comprises a back portion and the second seat pan comprises a recess portion partially receiving the back portion.

13. A method of assembling a seat assembly comprising:
   coupling a front portion of a first seat pan to a vehicle frame;
   coupling a grab strap to the first seat pan;
   coupling a rear portion of the first seat pan to a fender assembly;
   inserting the grab strap through a first opening in a second seat pan;
   coupling a front portion of the second seat pan to the fender assembly; and
   coupling a rear portion of the second seat pan to the fender assembly.

14. The method of claim 13 wherein coupling the front portion comprises coupling tabs of the first seat pan into a receiver associated with the vehicle frame.

15. The method of claim 13 wherein coupling the grab strap to the fender assembly comprises coupling the grab strap to the first seat pan with a first bracket.

16. The method of claim 15 wherein coupling the rear portion of the first seat pan comprises coupling the rear portion of the first seat pan to the fender assembly with the first bracket and a first fastener coupled therethrough.

17. The method of claim 16 wherein inserting the grab strap comprises inserting the grab strap though the first opening in the second seat pan through a seat support and a seat cover.

18. The method of claim 16 wherein coupling the front portion of the second seat pan comprises coupling the front portion of the second seat pan to the fender assembly with the first fastener.

19. The method of claim 16 wherein coupling the front portion of the second seat pan comprises coupling the front portion of the second seat pan to the fender assembly with the first fastener by inserting a head of the first fastener into a second opening of the second seat pan.

20. The method of claim 13 wherein coupling the rear portion of the second seat pan comprises coupling the rear portion of the second seat pan with a second bracket coupled and a second fastener.

* * * * *